UNITED STATES PATENT OFFICE.

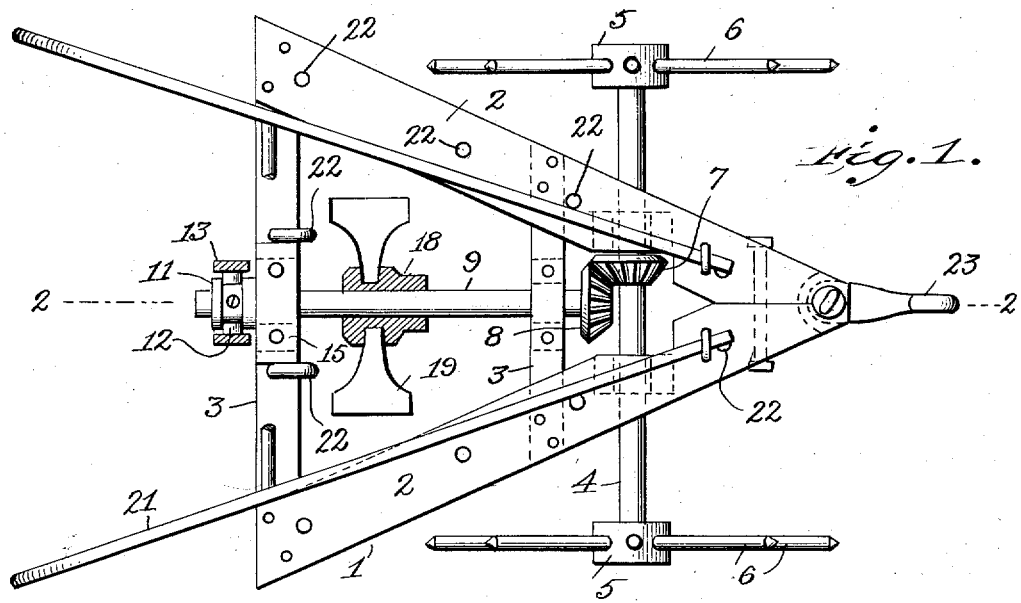
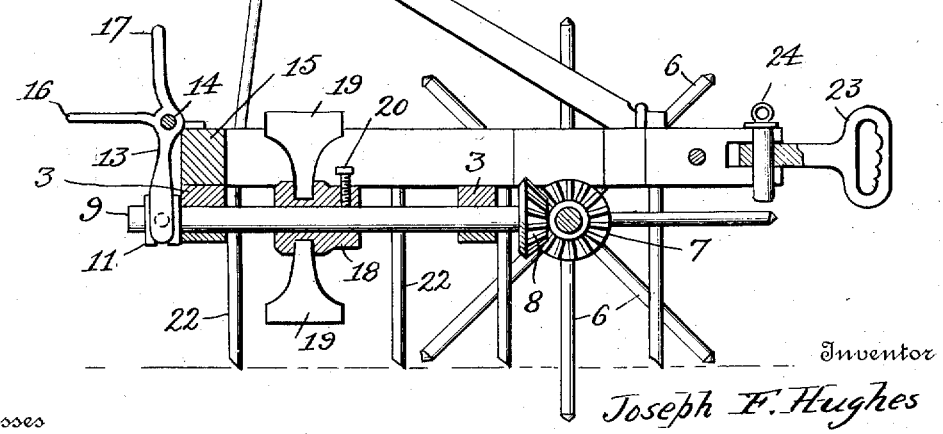

JOSEPH F. HUGHES, OF COMMERCE, GEORGIA.

COMBINED COTTON CHOPPER AND CULTIVATOR.

967,921.  Specification of Letters Patent.  Patented Aug. 23, 1910.

Application filed March 9, 1910. Serial No. 548,164.

*To all whom it may concern:*

Be it known that I, JOSEPH F. HUGHES, a citizen of the United States, residing at Commerce, in the county of Jackson and State of Georgia, have invented certain new and useful Improvements in a Combined Cotton Chopper and Cultivator, of which the following is a specification.

My invention relates to combined cotton choppers and cultivators, and has for its object to provide certain improvements in the construction of the same, as will be hereinafter more definitely pointed out, reference being had to the accompanying drawing, in which:

Figure 1 is a top plan view of my improved device, certain parts being shown in section. Fig. 2 is a vertical longitudinal sectional view on the line 2—2, Fig. 1.

In the said drawing the reference numeral 1 denotes the main frame of the device, the same being triangular in shape and consisting of the side bars 2 and cross bars 3. Mounted in bearings in the side bars 2 near their front ends is a transverse shaft 4 carrying at its ends rotating hubs 5 in which are located the radial teeth 6, said hub and teeth forming rimless wheels, as shown. Said shaft 4 has also mounted thereon a bevel gear 7 adapted to mesh with a similar gear 8 mounted upon the front end of a longitudinal shaft 9, carried in suitable bearings in the cross bars 3. Said shaft 9 is longitudinally movable, and at its rear projecting end is provided with a grooved collar 11, with which engages the stubs or rollers 12, carried by the lower bifurcated end of a lever 13, pivoted at 14 upon a block 15, mounted on the rear cross bar 3, and formed at its upper end into two rigid arms 16 and 17, angularly disposed with respect to each other, as shown. Also mounted on shaft 9 intermediate said bars 3, is a hub 18 carrying suitable cotton chopper arms 19. This hub 18 is longitudinally shiftable on shaft 9 and is retained in any adjusted position by means of a set screw 20. The frame is provided with the usual handles 21, and the bars 2 are provided on their under sides with a series of cultivator teeth 22, as shown. A clevis 23 is attached to the front end of the frame 1, the same being detachably retained by the usual pin 24.

In operation the device will be supported upon the teeth 22, and the radial teeth 6, by their contact with the ground in the forward movement of the device, will rotate shaft 4, thereby imparting rotary movement to shaft 9, and cotton chopper arms 19, when the parts are in the position shown in Fig. 2. To throw the shaft 9 out of operation, the arm 17 may be kicked forward, thereby shifting the shaft 9 longitudinally sufficiently to bring the gear 8 out of mesh with gear 7. It will be obvious that to restore the parts to their operative position it is only necessary to depress arm 16.

By employing the rimless toothed wheels I effectually prevent sidewise movement of the device on hillsides, said wheels operating to maintain the device in a right line.

Having thus fully described my invention, what I claim is:—

A combined cotton chopper and cultivator, embodying a frame, cultivator teeth supporting said frame, a transverse shaft provided with actuating wheels at each end, a shiftable longitudinal shaft, a chopper on the latter shaft, gears on said shafts adapted to mesh, a grooved collar on said longitudinal shaft, and a pivoted lever for shifting said shaft, embodying a bifurcated lower end provided with rollers adapted to engage the grooved collar, and rigid separated upper arms angularly disposed to each other.

In testimony whereof I affix my signature in presence of two witnesses.

JOSEPH F. HUGHES.

Witnesses:
WILLIAM L. SAILERS,
G. H. HINNANT.